(12) United States Patent
Schneider et al.

(10) Patent No.: US 7,931,827 B2
(45) Date of Patent: Apr. 26, 2011

(54) MIXTURE AND METHOD FOR IMPRINTING TEXTILES

(75) Inventors: Reinhold Schneider, Stuttgart (DE); Marion Funkler, Sindelfingen (DE)

(73) Assignee: ITCF Institut fuer Textilchemie und Chemiefasern, Denkendorf (DE)

(*) Notice: Subject to any disclaimer, the term of this patent is extended or adjusted under 35 U.S.C. 154(b) by 701 days.

(21) Appl. No.: 11/883,025

(22) PCT Filed: Dec. 27, 2005

(86) PCT No.: PCT/EP2005/014053
§ 371 (c)(1), (2), (4) Date: Jul. 25, 2007

(87) PCT Pub. No.: WO2006/079415
PCT Pub. Date: Aug. 3, 2006

(65) Prior Publication Data
US 2008/0169452 A1    Jul. 17, 2008

(30) Foreign Application Priority Data
Jan. 25, 2005  (DE) .................... 10 2005 003 596

(51) Int. Cl.
| H01B 1/02 | (2006.01) |
| H01B 1/04 | (2006.01) |
| H01B 1/06 | (2006.01) |
| H01B 1/08 | (2006.01) |
| B29C 71/04 | (2006.01) |
| B41M 7/00 | (2006.01) |

(52) U.S. Cl. ............ 252/502; 252/512; 252/518.1; 252/519.5; 252/520.1; 252/520.2; 252/521.2; 522/71; 522/74

(58) Field of Classification Search .......... 252/502, 252/512, 518.1, 519.5, 520.1, 520.2, 521.2; 522/71, 74
See application file for complete search history.

(56) References Cited

U.S. PATENT DOCUMENTS

| 5,830,927 | A | 11/1998 | Vanderhoff et al. |
| 6,433,038 | B1 | 8/2002 | Tanabe et al. |
| 6,443,569 | B1 | 9/2002 | Mheidle et al. |
| 6,756,129 | B1 * | 6/2004 | St. Arnauld ............... 428/500 |
| 6,787,583 | B2 * | 9/2004 | Veya et al. ............... 522/149 |
| 7,479,511 | B2 * | 1/2009 | Laksin et al. ............. 522/84 |
| 2001/0056056 | A1 * | 12/2001 | Housmekerides et al. ... 510/302 |
| 2002/0086914 | A1 * | 7/2002 | Lee et al. ................. 522/75 |
| 2002/0198289 | A1 * | 12/2002 | Gummeson ................ 523/400 |
| 2003/0083396 | A1 * | 5/2003 | Ylitalo et al. ............. 522/74 |
| 2003/0109599 | A1 * | 6/2003 | Kamen ................... 523/160 |
| 2005/0004261 | A1 | 1/2005 | Yatake |
| 2005/0175925 | A1 * | 8/2005 | Johnson et al. ........... 430/270.1 |
| 2007/0106017 | A1 * | 5/2007 | Kessel et al. ............. 524/589 |

FOREIGN PATENT DOCUMENTS

| DE | 19727766 A | * | 1/1999 |
| DE | 19727767 A | * | 1/1999 |
| DE | 19739620 A | * | 3/1999 |
| DE | 19753831 A | * | 6/1999 |
| EP | 0 555 950 A1 | | 8/1993 |
| EP | 1 571 184 A1 | | 9/2005 |
| JP | 07179801 | | 7/1995 |
| WO | WO-03/072664 A1 | | 9/2003 |
| WO | WO-2004/035684 A2 | | 4/2004 |
| WO | WO 2005/038823 A1 | * | 4/2005 |

OTHER PUBLICATIONS

Monroe et al., "Photoinitiators for Free-Radical-initiated Photoimaging Systems," Chem. Rev., 93, pp. 435-448 (1993).*
"Dynol 604" Registry No. 169117-72-0, STN/Chemical Abstracts Service.*
"Raven Blacks" Columbian Chemical Company Product Brochure.*
"Dynol 604" Registry No. 169117-72-0, STN/Chemical Abstracts Service Oct. 19, 1995.*
"Raven Blacks" Columbian Chemical Company Product Brochure Apr. 2005.*
International Search Report dated Mar. 21, 2006, issued in PCT/EP2005/014053.

* cited by examiner

*Primary Examiner* — Mark Kopec
*Assistant Examiner* — Jaison P Thomas
(74) *Attorney, Agent, or Firm* — Venable LLP; Robert Kinberg; Michael E. Nelson

(57) ABSTRACT

The invention relates to a mixture and a method for imprinting textiles. The mixture used for the imprinting of textiles, includes:
A) at least one pigment;
B) at least one dispersing agent on the basis of oxalkylated linear or branched alkanes, fatty acids or fatty alcohols, and/or alkyl sulfates or alkyl sulfonates, and/or polyelectrolytes, and/or alkylated, and/or arylated glycosides;
C) at least one water-soluble or water-dilutable, radiation-hardenable binding agent with a molecular weight above 2000 g/mol and at least two polymerizable groups for each binding agent molecule, which are cross-linked to the binding agent molecule by at least one urethane group or urea group;
D) water.

38 Claims, No Drawings

MIXTURE AND METHOD FOR IMPRINTING TEXTILES

BACKGROUND OF THE INVENTION

The invention relates to a mixture and a method for imprinting textiles.

Currently used methods for imprinting textiles include the inkjet printing and the screen printing methods.

The inkjet printing process is widely used as a result of the rapid development of computer technology and, in the private sector, is primarily used for producing colored pictures on paper. This new technology has also moved into the industrial sector for textile imprinting and is currently used advantageously for designing patterns and producing small yardages. The inkjet printing systems presently available in the market place deliver printing resolutions ranging from 180 dpi to 720 dpi and work with 4 to 16 basic colors from the assortment of reactive, acid, dispersion, or pigment coloring agents. Above all, the pigment printing is of extreme and central importance because it can be used universally on different substrates. Depending on the print resolution, a printing speed of up to 150 m$^2$/h is possible at the present time, which is sufficient for the pattern design and production of small batch sizes because of the extremely short set-up times.

Even though the inkjet printing permits an extremely flexible production of high-quality colored textiles, conventional fixation methods represent a limiting factor that keeps this technology from gaining ground. Standard fixation units, for example steamer units and dry fixation units, cannot be adapted to this innovative printing technique because of their size, thus negating at least in part the advantages achieved with the inkjet printing. The fact that fixation occurs offline, in a separate operational step, is a particular disadvantage. The fixation units of known systems using inkjet printers for the imprinting of textiles take the form of steamers, which are positioned downstream, immediately following the inkjet printers, and which more or less permit a thermal online fixation of the printing patterns with the aid of hot air or saturated steam. These types of systems have the disadvantage that in order to finish the print patterns on the textiles, the textiles must be rewashed in a last operational step to remove pretreatment chemicals and non-fixated coloring agent components. This post-treatment is carried out in a manner known per se with the aid of washing units and dryers. So far, the production of inkjet printing patterns has not yet been realized with an online method, which represents a limiting factor for the flexible production of individual printing patterns using the inkjet method. It is therefore the object to provide a fixation unit with small dimensions and extremely flexible use, which can be realized using strong UV light sources. However, this requires the development and the use of suitable UV hardenable printing inks.

The inks used for the inkjet printing method must meet a plurality of specific requirements, wherein the viscosity and surface tension among other things play a crucial role in the formulation of the printing ink. Inks which can be used in inkjet printers have a water-like ink viscosity of less than 6 mPas and a surface tension of 20 to 50 mN/m. To prevent the ink from drying inside the nozzles, hygroscopic additives such as ethylene glycol, urea, or glycerin must furthermore be added to the ink. In addition, the electrolyte content (salts) of the ink must be kept to the lowest possible level to prevent possible corrosion on the printing head. To avoid nozzle obstructions (nozzle diameter <20 μm), particle sizes of <1 μm are required. These boundary conditions for the printing inks are determined by the type of printing head used and are extremely narrowly defined. In the case of pigment coloring agents, the standard concentration for use in most cases is only around 2% since the ink viscosity can increase strongly because of the presence of the binding agent. If the binding agent share and the pigment share increase strongly, the ink viscosity in part also increases strongly, thus making it even harder or impossible to print with this ink. For that reason, mostly pure pigment inks without added binding agents are primarily used at the present time. The binding agent is applied during a separate step, in which the imprinted material is submerged for impregnation and the imprinted textile material is then thermally fixated in another separate operating step.

Several UV curable systems for the inkjet and screen printing methods have already been introduced in the market place, which for the most part are present as 100% systems and must be adapted to the required viscosity level by adding low-viscous, mostly toxic reactive diluting agents. The expression 100% system is understood to refer to systems, which harden and cure completely during the fixation process, meaning at 100%, after they are applied to the textiles. In the market place, systems of this type are not acceptable for textile applications because of the skin-sensitizing effect and the toxic potential of the monomers in the form of residual monomers with incomplete reaction in the hardened printing pattern. Added to this is the fact that the use of such 100% systems results in an unacceptable stiffening of the imprinted textile patterns and is therefore also not acceptable in the market place.

The option of lowering the viscosity to improve the printability by adding organic solvents with correspondingly low viscosity must be ruled out from the start for ecological reasons and is not acceptable for the inkjet printing on textiles, particularly textile material used for clothing. The use of water-dilutable systems is in principle conceivable for the textile finishing process. However, the water-dilutable UV hardenable printing inks for inkjet applications, described so far in the relevant literature, contain biologically non-degradable alkylphenol ethoxylates (APEO) as dispersing agents for the pigments, which will be banned in the near future because of their toxicity to fish and their toxic decomposition products. Also used in such formulations are dispersing agents on the basis of condensates from formaldehyde and aryl sulfonic acids, as well as naphthalene sulfonic acid formaldehyde condensates, which also decompose slowly biologically and furthermore have the problem that the skin-sensitizing formaldehyde forms again. Examples of these systems are described in the following German Patent Applications: 197 39 620 A1, 197 53 831 A1, 197 27 766 A1 and 197 27 767 A1. Owing to the above-described disadvantages, neither the 100% systems nor the water-dilutable UV hardenable systems have found their way into practical operations involving textile materials.

It is the object of the present invention to make possible an environment-friendly, highly efficient imprinting of textiles while ensuring a high quality and functionality of these textiles.

SUMMARY OF THE INVENTION

This object is solved with a mixture used for the imprinting of textiles, comprising:
A) at least one pigment;
B) at least one dispersing agent selected from the group consisting of oxalkylated linear or branched alkanes, fatty acids or fatty alcohols, and/or alkyl sulfates or alkyl sulfonates, and/or polyelectrolytes, and/or alkylated, and/or arylated glycosides;

C) at least one water-soluble or water-dilutable, radiation-hardenable binding agent with a molecular weight above 2000 g/mol and at least two polymerizable groups for each binding agent molecule, which are cross-linked to the binding agent molecule by at least one urethane group or urea group;

D) water; and a method for imprinting textiles with the aid of a continuous processing operation, said method comprising the process of imprinting textiles with said mixture and fixating the imprinted patterns immediately thereafter with the aid of radiation, at a temperature that is greater than 70° C. and less than 140° C.

DETAILED DESCRIPTION

Advantageous embodiments and useful modifications of the invention are described in detail below. One essential advantage of the mixture according to the invention, as disclosed above, is that this mixture is completely free of alkyl phenol ethoxylates (APEO), as well as formaldehyde condensates, and is therefore extremely friendly to the environment.

A further critical advantage is that the textiles imprinted with the mixtures according to the invention are soft to the touch and have good fastness values, especially good light fastness and fastness to rubbing and washing, without requiring further post-treatment steps.

One essential advantage of the method according to the invention is that the printing and fixation can be realized with an online method, meaning the fixation occurs immediately after the printing operation and without intermediate steps. The fixation of the mixture imprinted on the textiles can be realized efficiently and energy-saving by irradiating and simultaneously supplying heat to the textiles.

According to a first embodiment, electron beams can be used for the hardening of the mixtures applied to the textiles during the imprinting.

With this embodiment, a mixture having the components as disclosed above is sufficient since a polymerization of the binding agent is achieved by using the electron beams, without further admixtures, thereby resulting in agglutination of the pigments in the mixture and the textile fibers.

Alternatively or in addition thereto, the mixture can be hardened by exposing it to UV radiation, wherein the component E must be added to the mixture. Component E) is at least one water-soluble or water-dispersed photo initiator. Photo initiators are selected from the group consisting of α hydroxyketones, benzyl ketones, monomer and polymer hydroxyketones, α aminoketones, bis-acyl-diphenylphosphinoxides, benzophenones, acetophenon, 2-phenylacetophenones, and isopropyl thioxanthone. Co-initiators, in particular nitrogen-containing co-initiators, tertiary amines and/or alkoxylated acrylat monomers can, in turn, also be added to the photo initiators.

Alternatively or in addition, the mixture can also be hardened by using infrared (IR) radiation, which requires the admixture of radical primers. Thus the mixture can contain F) at least one thermally activated radical starter; and the radical starter is dibenzoylperoxide or sodiumperoxidedisulfate.

According to one advantageous embodiment of the invention, the textiles to be imprinted can be pre-treated by impregnating them with chemicals. An improvement in the contour quality during the printing can be achieved through pre-impregnation with cationic compounds and/or thickening agents. Improvements in the fastness are achieved through pre-impregnation of the textiles with binding agents and photo-initiators and/or with adhesion promoters.

According to one advantageous embodiment, the mixture according to the invention contains color pigments for generating preferably multi-colored printing patterns.

However, the invention is not limited to generating printing patterns of this type. Rather, the mixtures can contain different pigments for achieving defined functionalities for the textiles.

In particular, the pigments can be embodied as white pigments, wherein these can be composed in particular of $TiO_2$, barium sulfate and/or zinc oxide and can be used for producing white inks.

Optically brightening pigments can furthermore be used for producing inks of a lighter color. Suitable for this are optical brightening agents on the basis of stilbenes, cumarin derivatives, diphenylpyrazolines, bisbenzazoles.

Transparent mixtures can also be produced using nanoscale particles as pigments. Transparent mixtures of this type can be used, for example, for providing the textiles with safety codes, which are not visible to the human eye and can be made visible only with the aid of UV or IR radiation. Safety codes of this type make it possible to distinguish original goods from plagiarized goods.

According to a different variant, the mixtures according to the invention can contain conductive particles that make it possible to achieve specific conductivity characteristics or electromagnetic screening effects for the textiles imprinted therewith. Alternatively or additionally, the mixtures can also contain magnetic particles.

The mixtures according to a different variant of the invention can contain heat-reflecting or heat-absorbing particles, which make it possible to achieve a cooling effect or a heating effect for the textiles imprinted therewith.

The mixture according to the invention contains alkyl sulfates or alkyl sulfonates as components of the dispersing agent. In particular, these act as plasticizers and represent an essential characteristic of the mixture according to the invention, especially for achieving a soft feel for the imprinted textiles.

The mixture according to the invention can furthermore contain plasticizers on the basis of silicones, and/or on the basis of fatty acid polyglycol esters, and/or alkoxylated fatty alcohols, and/or alkyl amine polyglycol ether, and/or fatty acid amide polyglycol ether, and/or fatty alcohol sulfates, and/or alkyl carboxylates, wherein cationic plasticizers on the basis of quaternary ammonium compounds can also be used.

The mixtures according to the invention are preferably ink preparations, wherein preferred embodiments are described as follows: In accordance with the invention, an ink preparation comprises the following components, on a weight:

0.1 to 10 weight % of the component A 0.1 to 30 weight % of the component B 0.1 to 15 weight % of the component C 0.1 to 5 weight % of the component E 0 to 5 weight % of the component F at least 50 weight % of the component D.

The ink preparation can comprise as additional component G a multivalent alcohol and/or a polyalkyleneglycol with a higher boiling point than water for improving the running characteristics. The ink preparation can comprise as additional component H an additive in the form of a surfactant, a plasticizer, a defoamer and/or a preserving agent. The mixture may further include plasticizers selected from the group consisting of silicones, and/or fatty acid polyglykolesters, and/or alkoxylated fatty alcohols, and/or alkylaminepolyglycolether, and/or fatty acid amidepolyglycolether, and/or fatty alcohol sulfates, and/or alkylcarboxylates, and/or cationic plasticizers which are quaternary ammonium compounds. The ink preparation comprises 0.1 to 10 weight % of the components G and/or H. The ink preparation has an ink viscosity of less than 10 mPas and a surface tension in the range of 20 to 50 mN/m. The ink pigment has a particle size of less than 0.8 µm. In that case, the textile materials are preferably imprinted using an inkjet printing method. The characteristics of the ink preparations, particularly their viscosities, can be adapted to the requirements of these inkjet printing methods.

The mixtures according to the invention can furthermore be embodied as paste preparations, wherein preferred embodiments are described as follows: The mixture comprises pigment which has a particle size of less than 0.8 µm. and the mixture is a paste preparation. The paste preparation also comprises a thickening agent in addition to the components for the ink preparation. In that case, the textiles are advantageously imprinted with a screen printing method.

The invention is explained in further detail in the following with the aid of specific embodiments and examples.

The APEO free pigment dispersions are preferably produced through grinding in a pearl grinder of the pigments (component A) with water and the dispersing agents (component B) on the basis of suitable oxalkylated linear or branched alkanes, fatty acids or fatty alcohols, and/or alkyl sulfates/sulfonates, and/or polyelectrolytes, and/or alkylated, and/or arylated glycosides. The pigments (component A) are understood to be fine-particle inorganic or organic pigments or mixtures thereof. Examples for pigments of this type are Pigment Red 122, Pigment Black 7, Pigment Blue 15:3, Pigment Yellow 17, and Pigment Yellow 83, which are particularly suitable for the formulation of CMYK [cyan, magenta, yellow, and key (Black)] inks. Other inorganic or organic color pigments and non color-providing pigments can generally also be used for the ink formulation. The share of dispersing agent relative to the pigment is in the range of 10-300%, depending on the pigment and dispersing agent that is used. Following the grinding in the pearl grinder, the pigment dispersions are diluted with water to the necessary concentrations for use, ranging from 0.1 to 10%, thereby resulting in sedimentation-stable and low-viscous (viscosity is <10 mPas), water-based pigment dispersions, which are especially suitable for formulating the UV hardenable printing inks according to the invention.

Free radical cured and hardened urethane acrylates, hardenable with at least two reactive, polymerizable groupings for each molecule, are used as binding agents (component C) for the radiation hardenable pigment inks according to the invention. Especially preferred are hydrophilic modified urethane acrylates or urethane methacrylates, but also the corresponding analog urea compounds (urea acrylates or urea methacrylates with a molecular weight of >20000 g/mol), which can be produced easily in a two-stage synthesis, may be used. In the first synthesis stage, a diol and/or a polyol molecule (diamine and/or polyamine), which in turn can be alkoxylated multiple times (e.g. ethoxylated, propoxylated, or mixed alkoxylated) and/or which can support functional groups, is allowed to react with at least two moles of a diisocyanate (especially preferred is a diisocyanate with graduated reactivity such as isophorondiisocyanate (IPDI) but also hexamethylene diisocyanate or mixtures of diisocyanates) in the presence of a catalyst to form a water-soluble diisocyanate and/or polyisocyanate. In a second synthesis step, the unreacted isocyanate groups in the resulting water-soluble diisocyanate and/or polyisocyanate are allowed to react in the presence of a catalyst with hydroxyalkylacrylates or hydroxyalkylmethacrylates to form urethaneacrylate and/or urethanemethacrylate (urea acrylate, urea methacrylate), resulting in at least two reactive polymerizable groupings for each molecule. The obtained urethaneacrylate and/or the urethane methacrylate (urea acrylate, urea methacrylate) is water soluble and can be adjusted to the desired application concentration for the inkjet ink by adding water. The UV hardenable inkjet inks can be produced by using such water-dilutable urethane acrylates and/or urethane methacrylates (and the analog urea acrylates and/or urea methacrylates) containing several polymerizable groups. Following the hardening, these inks form a cross linked polymer film that glues together the pigment and the fiber and, with the standard application amounts of up to 20 ml ink/qm, results in a particularly high fastness to rubbing with simultaneously soft feel. It must be considered an additional advantage of this binding agent that it can be used equally well in a watery diluted form, especially in concentrations of up 20%, for the printing with piezo inkjet printers as well as bubble jet printers, thus making it possible to have a sufficiently high binder concentration on the imprinted substrate for meeting the fastness requirements. One advantage of these binding agents is that they can also be used without the admixture of pigments for the printing.

The UV hardenable ink formulations furthermore contain a photo initiator (component E), in a concentration for use of up to 14%, relative to the binding agent. Particularly suitable as photo initiators are mixtures of watery formulations (dispersions and water-soluble photo initiators) of various generally known photo initiator structures and their derivatives (e.g. α hydroxy ketones, benzyl ketones, monomer and polymer hydroxy ketones, α amino ketones, bis-acyl diphenyl phosphinoxides (e.g. 2,4,6-trimethylbenzoyldiphenylphosphinoxide), benophenones, acetophenon, 2-phenylacetophenones, isopropyl thioxanthon, bi-functional photo initiators on the basis of ketosulfones and others), which can absorb UV radiation with a specific wavelength and, as a result of the absorbed energy, can form radicals that start the polymerization of the polymer binding agent. Furthermore added can be nitrogen-containing co-initiators (e.g. ethyl-4-dimethylaminobenzoate) can be added, as well as synergetic acting tertiary amines and alkoxylated acrylat monomers.

Further components of the UV hardenable pigment inks according to the invention can include watery dispersions of a thermally activated radical starter (component F), such as dibenzoylperoxide, Na peroxide sulfate and more. IR radiation can thus also be used for the hardening. De-gassed water (component D) can be used as diluting medium. The radiation hardenable inkjet inks according to the invention can furthermore include admixtures for improving the running characteristics and the fastnesses of the ink in the form of the component G, wherein multivalent alcohols and/or polyalkylene alcohols are preferably used for this. The ink can also contain additional admixtures in the form of the component H, for example defoamers, plasticizers, preserving agents, and thickening agents.

The UV hardenable, watery pigment inks according to the invention in particular have the following preferred compositions:

Pigment share (A): up to 10% (standard concentration for standard CMYK 2%)
Dispersing agent (B): up to 6% (for standard CMYK 2% pigment share)
Binding agent (C): up to 10% water-soluble UV hardenable binding agent
Photo initiator (E): up to 1.4% active photo initiator Radical starter (F): up to 1%
Hygroscopic additives (G): up to 5%
Additives (H): up to 0.5% surfactant, plasticizer, defoamer, preserving agent
De-gassed water (D): remaining share.

The printing inks are produced by mixing together the required amounts for use of the components A-C, as well as E, F and the components G and H in a suitable device (e.g. a beaker with stirring mechanism) and stirring this mixture for 10 minutes. Following this, the mixture is diluted to the required application concentration by adding de-gassed water and by stirring it intensively for 15 minutes. Prior to the use, the printing inks produced in this way are filtered with the following multi-stage filtering method:

| No. | Filter pore size | Typical filtration period for 100 ml ink |
|---|---|---|
| 1 | 40 μm | 30 s |
| 2 | 20 μm | 2 min |
| 3 | 11 μm | 2 min |
| 4 | 6 μm | 3 min |
| 5 | 2.5 μm | 8 min |
| 6 | 8 μm | 30 s |
| 7 | 5 μm | 30 s |
| 8 | 3 μm | 30 s |
| 9 | 0.8 μm | 2 min |

The filtered inks are ready for printing and can be used either in the bubble jet printer or the piezo inkjet printer. The above-described inks can be used for directly imprinting textiles with an inkjet printer and the ink can be fixated online, using a downstream connected UV fixation unit, without intermediate drying and at an operating temperature of >70° C. The UV fixation unit is preferably embodied as UV scanner, with periodic scanning by the UV radiation source or the UV rays emitted by this source.

Printing samples were prepared with a Mimaki JV2-130 inkjet printer, which operates based on the drop-on-demand (DOD) method with piezo technology. The printing was realized with a print resolution of 720 dpi and 8 pass and a printing speed of 5 qm/h, resulting in an average ink application of approximately 18.7 ml/m² for the completely imprinted surface, wherein the nozzle diameter is 20 μm. Additional printing samples were prepared with an EN-CAD TX1500 (bubble jet printer), at a printing speed of 6 qm/min and a print resolution of 360 dpi at 4 pass. The ink application is approximately 15 ml/m² and the nozzle diameter is 45 μm. The printing involved a pattern consisting of differently fine lines and color surfaces, as well as a full-surface printing (90 cm width), which makes it possible to assess the quality of the contour, as well as the color depth and the print penetration.

The fixation of the printing patterns occurs continuously online during the printing operation, with the aid of a UV scanner by the company IST-METZ GmbH (Nürtingen), connected downstream of the inkjet printer, and using 5 dual radiation passes (5 pass). The UV scanner was adjusted such that the total average time for irradiating the textile material was at maximum 10s lag. An Hg-UV lamp with a capacity of 200 W/cm, arranged at a distance to the textile material of approx. 5 cm, was used for the fixation. Owing to the IR radiation emitted by the UV scanner, the textile material is heated during the fixation to temperatures above 70° C., which positively supports the fixation of the binding agent according to the invention. When using a cold light UV fixation device, the textile material would have to be heated to above 70° C. with a separate unit to achieve the necessary fastness values.

The textiles, imprinted with the inks according to the invention, and fixated using the method according to the invention, deliver color-depth printing patterns with high fastness values. In addition, the textiles imprinted with this method have excellent dry fastness, wet fastness, and light fastness values and, in particular, also have a soft feel. A further advantage of the invention is the fact that high fastness values can be achieved when optionally imprinting polypropylene and fiber mixtures.

Example 1

APEO free pigment dispersions by the company Minerva/Italy are used for the ink formulation. These are products stemming from the Innoprint project, namely Pigment Blue 153-16, Pigment Red 122-01, as well as Pigment Yellow83-02 and Pigment Black 07-01, which are present as 10% watery dispersion in the starting batch, at a share of 20% relative to the finished ink. The binding agent used for the starting batch is a urethane acrylate-based water-diluted system called Ebecryl 2001 by the company UCB/Belgium, which is added at a share of 10% relative to the finished ink. Watery dispersed photo initiators (Esacure DP250) by the company Lamberti/Italy, with a share of 0.3% relative to the finished ink, represent a different main component that is added and subsequently stirred in for 10 minutes. The mixture is then diluted with 69.7% de-gassed water, intensively stirred in for 15 minutes, to obtain the required application concentration. The printing inks produced in this way are then filtered by using the following multi-stage methods, with an applied vacuum of approximately 100 mbar.

| No. | Filter pore size | Typical filtration period for 100 ml ink |
|---|---|---|
| 1 | 40 μm | 30 s |
| 2 | 20 μm | 2 min |
| 3 | 11 μm | 2 min |
| 4 | 6 μm | 3 min |
| 5 | 2.5 μm | 8 min |
| 6 | 8 μm | 30 s |
| 7 | 5 μm | 30 s |
| 8 | 3 μm | 30 s |
| 9 | 0.8 μm | 2 min |

The filtered inks are ready for printing and have an ink viscosity of less than 5 mPas, as well as a surface tension in the range of 20 to 50 mN/m. These inks can be printed directly onto the textiles with bubble jet printers (Encad) as well as piezo inkjet printers (Mimaki).

The printing results listed in the following were achieved with a Mimaki JV2-130 inkjet printer, which operates based on the DOD method and using piezo technology. The printing was carried out with a print resolution of 720 dpi and 8 pass and a printing speed of 5 qm/h, resulting in an average ink application of approximately 18.7 ml/m² for the completely imprinted surface, wherein the nozzle diameter was 20 μm. The online fixation of the printing patterns occurred continuously during the printing operation, with the aid of a UV scanner by the company IST-METZ GmbH (Nürtingen), connected downstream of the inkjet printer, and 5 dual radiation passes (5 pass). The UV scanner was adjusted for a total average irradiation period of the textile material at maximum 10 s lag. An Hg-UV lamp with a capacity of 200 W/cm and positioned at a distance of approx. 5 cm to the textile material was used for the fixation. As a result of the IR radiation emitted by the UV scanner that is used, the textile material heats up during the fixation to temperatures above 70° C., thus positively supporting the fixation of the binding agent according to the invention. During the fixation process, the following temperatures were measured in dependence on the number of illuminations and a scanner speed of 300 mm/s:

1. Illumination 37° C.
2. Illumination 43° C.
3. Illumination 49° C.
4. Illumination 70° C.
5. Illumination 77° C.
6.-10. Illumination 88° C.

Pre-treated textile materials of 100% cotton were imprinted. Also imprinted as comparison materials were textiles of polyester and viscose.

The following characteristics of the printing patterns were detected:

TABLE 1

Color depth in cotton

| Ink | color depth K/S in cotton for the ink acc. to example 1 | color depth K/S in cotton for the standard ink (BASF EVO P 100) |
|---|---|---|
| Cyan | 2 | 4 |
| Magenta | 2.8 | 3.06 |
| Yellow | 3.3 | 2.4 |
| Black (key) | 5.8 | 6.4 |

TABLE 2

Fastness values for wet and dry shown with the Example 1

| Ink (example 1) | Cotton | | Polyester | | Viscose | |
|---|---|---|---|---|---|---|
| | dry | wet | dry | wet | dry | wet |
| Cyan | 4-5 | 3 | 5 | 4 | 4 | 3-4 |
| Magenta | 4-5 | 3 | 5 | 4 | 4 | 2-3 |
| Yellow | 4-5 | 3 | 5 | 3 | 4 | 2 |
| Black | 3-4 | 2 | 5 | 3 | 3 | 2 |

(Scale ranging from 5 = good to 1 = poor)

TABLE 3

Fastness values for wet and dry for the comparison ink (BASF)

| Ink (BASF EVO P100) | Cotton | | Polyester | | Viscose | |
|---|---|---|---|---|---|---|
| | dry | wet | dry | wet | dry | wet |
| Cyan | 4 | 3 | 4 | 1 | 4 | 2 |
| Magenta | 4 | 3 | 4 | 1 | 4 | 3 |
| Yellow | 5 | 4 | 4 | 1 | 5 | 3 |
| Black | 2 | 2 | 4-5 | 3 | 4-5 | 2 |

TABLE 4

Washing fastness (DIN EN ISO 105-C06) for example 1 of cotton

| | Color change | Bleeding into cotton | Bleeding into viscose |
|---|---|---|---|
| Cyan | 5 | 5 | 5 |
| Magenta | 5 | 5 | 5 |
| Yellow | 5 | 5 | 5 |

TABLE 5

Light fastness values for cotton, used in example 1 (600 h Xenotest)

| Cyan | Magenta | Yellow | Black |
|---|---|---|---|
| 7 | 6-7 | 6-7 | 7 |

TABLE 6

Comparison of the flexural strengths for cotton

| | Example 1 | | BASF EVO P100 | |
|---|---|---|---|---|
| | warp | Weft | warp | weft |
| Cyan | 4.93 | 2.03 | 6.85 | 3.32 |
| Magenta | 6.29 | 2.65 | 5.5 | 2.84 |
| Yellow | 5.19 | 1.97 | 6.14 | 2.75 |
| Black | 4.86 | 2.29 | 5.28 | 2.34 |

The results showed that print-ready, UV hardenable inks can be produced for the inkjet printing on textiles, for which the quality level is in the range of or exceeds conventional, thermally hardenable pigment inks. The inks can be used in a continuous operation and can be fixated online. The achievable color depths must be considered sufficient. The rubbing fastnesses for the dry and wet state must be considered extremely good with a rating of 3-4 and above, wherein these value in part considerably exceed the corresponding values for the standard ink used (BASF EVO P100, thermal fixation for 3 minutes at 160° C.). A further improvement in the fastness values can be achieved through hardening of the imprinted substrate in an oxygen-reduced atmosphere (inert gas) (Table 7). Excellent washing fastness values with maximum ratings of 5 are furthermore obtained. Also emphasized should be the softness when handling the finished printing patterns (flexural strength values are lower than for comparison patterns) as well as the excellent light fastness values, which reach fastness ratings of 6-7 and above for all colors.

Example 2

The print-ready inks according to Example 1 were used for printing patterns on cotton, in the same way as for the Example 1, wherein the UV lamp housing that is open toward the printing side was flushed with an inert gas during the irradiation. Nitrogen gas was selected as inert gas, which generates an oxygen-reduced atmosphere in the illuminated field with a flow of 250 l/min (oxygen content <1000 ppm). The printing patterns hardened in the oxygen-reduced atmosphere show improved fastness to rubbing.

TABLE 7

Wet and dry fastness values for the fixation under the effect of inert gas on cotton

| Inert gas | Cyan | | Magenta | | Yellow | |
|---|---|---|---|---|---|---|
| | dry | wet | dry | wet | dry | wet |
| without | 4-5 | 3-4 | 4-5 | 3 | 4-5 | 3 |
| nitrogen | 4-5 | 4 | 4-5 | 3-4 | 4-5 | 3-4 |

Example 3

An electrically conductive UV hardenable paste can be produced when using graphite. For this, a starting batch is prepared with 20 g graphite powder together with 5 g of the dispersing agent Brij78 (eicosaethyleneglycol octadecylether) and 50 ml water and the mixture is then ground for 30 min in a pearl mill. Stirred into this dispersion are 2 g of a urethane acrylate-based water-dilutable binding agent called Ebecryl 2001 by the company UCB/Belgium, along with 0.2 g of the watery dispersed photo initiator Esacure DP250 by the company Lamberti/Italy and the resulting mixture is stirred for 5 minutes. Following this, 1.5 g of the thickening agent Prisulon SNP113 S (company CHT/Germany) is added along with water to form 100 g paste, and the mixture is stirred for 30 minutes to complete the printing paste. A comparison paste without binding agent and photo initiator is produced in the same way.

A flat screen printing machine by the company Zimmer was used for printing on cotton, wherein this machine has a printing speed of 5 m/min. The fixation of the printing pattern occurred under the same conditions as described for Example 1. The rubbing fastness is evaluated by subjecting the printed patterns to 100 abrasive strokes at the crock meter while the electrical resistance is measured at a distance of 1 cm to the measuring electrodes. The following measuring values were obtained:

TABLE 8

Influence of the binding agent on the fastness to rubbing and the electrical resistance when printing on cotton (Example 3)

| Ink (Example 3) | Resistance of fixated patterns | Resistance of fixated patterns after 100 abrasion strokes at the crock meter |
|---|---|---|
| electrically conductive ink with binding agent | 2.3 Kω | 5.0 kΩ |
| electrically conductive ink without binding agent | 0.8 Kω | >40 MΩ |

Electrical resistance measurements show that the use of a UV hardenable binding agent in electrically conductive pastes leads to a noticeable improvement in the fastness to rubbing.

The invention claimed is:

1. A mixture used for the imprinting of textiles, comprising:
   A) at least one pigment;
   B) at least one dispersing agent selected from the group consisting of oxalkylated linear alkanes, oxalkylated branched alkanes, fatty acids, fatty alcohols, alkyl sulfates, alkyl sulfonates, polyelectrolytes, alkylated glycosides, and arylated glycosides;
   C) at least one water-soluble or water-dilutable, radiation-hardenable binding agent with a molecular weight above 2000 g/mol and at least two polymerizable groups for each binding agent molecule, wherein the polymerizable groups are linked to the binding agent molecule by at least one urethane group or urea group, and wherein the polymerizable groups comprise acrylate groups or methacrylate groups; and
   D) water;
wherein the mixture is an ink preparation and the ink preparation further comprises component E, which is at least one water-soluble or water-dispersed photo initiator and component F, which is at least one thermally activated radical starter; and
the ink preparation is composed of the following shares, relative to the weight:
   0.1 to 10 weight % of the component A
   0.1 to 30 weight % of the component B
   0.1 to 15 weight % of the component C
   at least 50 weight % of the component D
   0.1 to 5 weight % of the component E
   0 to 5 weight % of the component F.

2. The mixture according to claim 1, wherein the binding agent is hardened by subjecting it to electron beams.

3. The mixture according to claim 1, wherein the photo initiator is selected from the group consisting of α-hydroxyketones, benzyl ketones, monomer and polymer hydroxyketones, α-aminoketones, bis-acyl-diphenylphosphinoxides, benzophenones, acetophenone, 2-phenylacetophenones, and isopropyl thioxanthone; and wherein a nitrogen-containing co-initiator comprising tertiary amines and/or an alkoxylated acrylate monomer is added to the photo initiators.

4. The mixture according to claim 1, wherein the binding agent can be hardened with UV radiation.

5. The mixture according to claim 1, wherein the radical starter is dibenzoylperoxide or sodiumperoxidedisulfate.

6. The mixture according to claim 1, wherein the binding agent can be hardened with IR (infrared) radiation.

7. The mixture according to claim 1, wherein said pigment is an organic or inorganic color pigment.

8. The mixture according to claim 1, wherein the pigment is a white pigment.

9. The mixture according to claim 8, wherein the white pigment is selected from the group consisting of $TiO_2$, barium sulfate, zinc oxide and admixtures thereof.

10. The mixture according to claim 1, wherein the pigment comprises electrically conductive particles.

11. The mixture according to claim 10, wherein the electrically conductive particles are composed of graphite, soot, tin antimony oxide or other metallic particles.

12. The mixture according to claim 1, wherein the pigments take the form of magnetic particles.

13. The mixture according to claim 12, wherein the magnetic particles are composed of iron or $Fe_3O_4$.

14. The mixture according to claim 1, wherein the pigments provided are heat-reflecting particles.

15. The mixture according to claim 14, wherein the heat-reflecting particles are composed of $TiO_2$ or are metal oxide-coated mica.

16. The mixture according to claim 1, wherein the pigments are heat-absorbing particles.

17. The mixture according to claim 16, wherein the heat-absorbing particles are composed of Sb-doped $SnO_2$ or soot.

18. The mixture according to claim 1, wherein the pigment comprises nano-scale particles and the mixture is optically transparent.

19. The mixture according to claim 1, which further comprises optically brightening pigments.

20. The mixture according to claim 19, wherein the pigment is an optical brightening agent selected from the group consisting of stilbenes, cumarin derivatives, diphenylpyrazolines, and bisbenzazoles.

21. The mixture according to claim 1, wherein the ink preparation comprises an additional component G which is a multivalent alcohol and/or a polyalkyleneglycol with a higher boiling point than water for improving the running characteristics.

22. The mixture according to claim 1, wherein the ink preparation comprises an additional component H which is an additive in the form of a surfactant, a plasticizer, a defoamer and/or a preserving agent.

23. The mixture according to claim 22, which comprises a plasticizer selected from the group consisting of silicones, fatty acid polyglycolesters, alkoxylated fatty alcohols, alkylaminepolyglycolether, fatty acid amidepolyglycolether, fatty alcohol sulfates, alkylcarboxylates, cationic plasticizers, quaternary ammonium compounds and admixtures thereof.

24. The mixture according to claim 1, wherein the ink preparation further comprises 0.1 to 10 weight % of component G, which is a multivalent alcohol and/or a polyalkyleneglycol with a higher boiling point than water for improving the running characteristics, and/or component H, which is an additive in the form of a surfactant, a plasticizer, a defoamer and/or a preserving agent.

25. The mixture according to claim 1, wherein the ink preparation has an ink viscosity of less than 10 mPas and a surface tension in the range of 20 to 50 mN/m.

26. The mixture according claim 1, wherein the pigment has a particle size of less than 0.8 μm.

27. The mixture according to claim 1, wherein the mixture is a paste preparation.

28. The mixture according to claim 27, wherein the paste preparation further comprises a thickening agent.

29. The mixture according to claim 28, wherein the thickening agent is selected from the group consisting of polyacrylic acid-based agent, polyvinyl alcohol-based agent, guar gum, starch, carboxy methyl cellulose, alginate and mixtures thereof.

30. The mixture according to claim 29, wherein the paste preparation has a paste viscosity exceeding 10 mPas.

31. A method for imprinting textiles in a continuous processing operation, said method comprising
imprinting textiles with a mixture according to claim 1; and
fixating an imprinted pattern immediately thereafter with the aid of radiation, at a temperature that exceeds 70° C. is less than 140° C.

32. The method according to claim 31, wherein fixation comprises subjecting the imprinted pattern to at least electron beams, UV rays or infrared radiation.

33. The method according to claim 32, wherein a screen printing technique is used for the printing with the mixture present in the form of a paste.

34. The method according to claim 31 wherein the mixture in the form of an ink is used for the printing with an inkjet printer.

35. The method according to claim 31, wherein the textiles are irradiated in an oxygen-reduced atmosphere.

36. The method according to claim 31, wherein the textiles to be imprinted are pre-treated with impregnating chemicals.

37. A mixture used for the imprinting of textiles, comprising:
A) at least one pigment;
B) at least one dispersing agent selected from the group consisting of oxalkylated linear alkanes, oxalkylated branched alkanes, fatty acids, fatty alcohols, alkyl sulfates, alkyl sulfonates, polyelectrolytes, alkylated glycosides, and arylated glycosides;
C) at least one water-soluble or water-dilutable, radiation-hardenable binding agent with a molecular weight above 2000 g/mol and at least two polymerizable groups for each binding agent molecule, wherein the polymerizable groups are linked to the binding agent molecule by at least one urethane group or urea group, and wherein the polymerizable groups comprise acrylate groups or methacrylate groups; and
D) water;
wherein the pigment comprises nano-scale particles and the mixture is optically transparent.

38. A mixture used for the imprinting of textiles, comprising:
A) at least one pigment;
B) at least one dispersing agent selected from the group consisting of oxalkylated linear alkanes, oxalkylated branched alkanes, fatty acids, fatty alcohols, alkyl sulfates, alkyl sulfonates, polyelectrolytes, alkylated glycosides, and arylated glycosides;
C) at least one water-soluble or water-dilutable, radiation-hardenable binding agent with a molecular weight above 2000 g/mol and at least two polymerizable groups for each binding agent molecule, wherein the polymerizable groups are linked to the binding agent molecule by at least one urethane group or urea group, and wherein the polymerizable groups comprise acrylate groups or methacrylate groups; and
D) water;
which further comprises optically brightening pigments.

* * * * *